July 30, 1946.   H. A. D. LINDSEY   2,404,806
SUBMARINE DETECTOR
Original Filed March 19, 1942

Inventor
Henry A. D. Lindsey
By [signatures]
Attorneys

Patented July 30, 1946

2,404,806

UNITED STATES PATENT OFFICE 2,404,806

SUBMARINE DETECTOR

Henry A. D. Lindsey, United States Army, Hickam Field, Honolulu, Territory of Hawaii Original application March 19, 1942, Serial No. 435,263, now Patent No. 2,379,447, dated July 3, 1945. Divided and this application March 29, 1943, Serial No. 480,955

5 Claims. (Cl. 177—385)

(Granted under the act of March 3, 1883, as amended April 30, 1928; 370 O. G. 757)

The invention described herein may be manufactured and used by or for the Government for governmental purposes, without payment to me of any royalty thereon.

This application is a division of my copending application Serial No. 435,263, filed March 19, 1942, Patent No. 2,379,447, July 3, 1945, entitled "Anti-submarine device."

This invention relates to submarine detectors and more particularly to a device in which the detection is made by picking up the electromagnetic flux generated by the motor or battery charger of the submarine.

It is an object of this invention to provide a submarine detector which may be carried by an aeroplane or other aircraft and which will be particularly suitable for use during night operations.

It is another object of my invention to provide a submarine detector which will be positive in its operation and of simple and inexpensive construction.

These and other objects of my invention will become apparent upon a consideration of the following detailed description when taken in conjunction with the accompanying drawing, in which—

Figure 1:
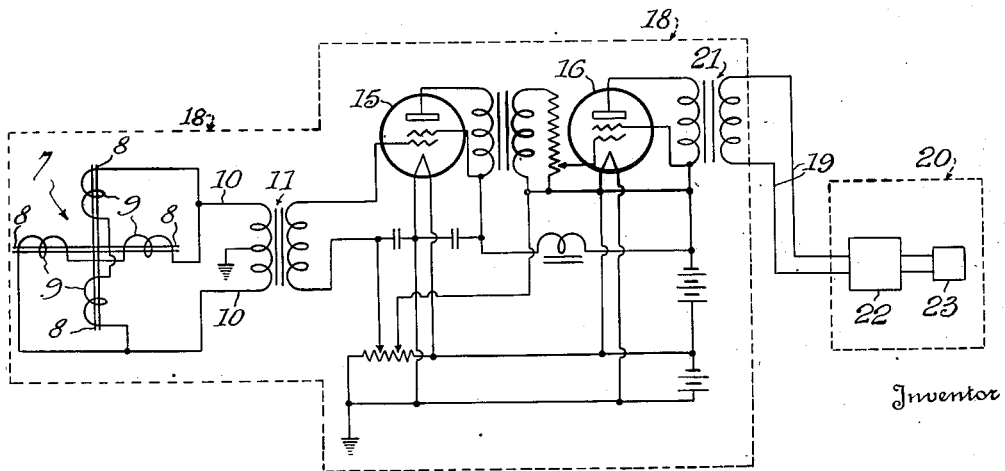
Fig. 1 is a schematic diagram of the circuit.

Referring to Fig. 1 it will be seen that there is provided an electromagnetic pickup device 7 comprising two crossed magnetic cores 8 of conventional core material about which are placed the balanced coils 9. By arranging the coils 9 in this manner each pair thereof will be linked to a common magnetic circuit through the core 8 so that practically all of the flux of one coil links with the other thus materially increasing the total inductions of the two coils and in consequence the sensitivity of said pickup devices. Lead wires 10 are connected to the primary of the balanced transformer 11. The output of the balanced transformer 11 is fed into a class B amplifier consisting of two or more tubes 15 and 16. The output of the final tube is fed through transformer 21 to the output cable 19. By utilizing class B operation, there will result a minimum drain on the batteries which will prolong the life thereof.

Upon an impulse in the coils 9, the transformer 11 will become unbalanced and cause a current to flow in the amplifier circuit. The electromagnetic pickup and the pre-amplifier are carried in a suitable scanning plane 18. By placing the pre-amplifier in the housing 18, it insures the prevention of accidental operation because of the plane disturbances and also insures that there will be sufficient impulse generated to overcome any losses which may be present in the output cable 19.

The amplified impulses are led through the output cable 19 to a high-gain amplifier 22, the output of which is fed to a suitable indicating device 23. The indicating device 23 may be arranged to give any desired type of indication either in the form of an audio signal or a visual signal, or a combination of both, and at the same time may be arranged to release a smoke-bomb or flare attached to the housing 18. This will mark the spot and identify the location of the submarine, enabling the bombardier to make successive attacks during hours of darkness.

Figure 2:
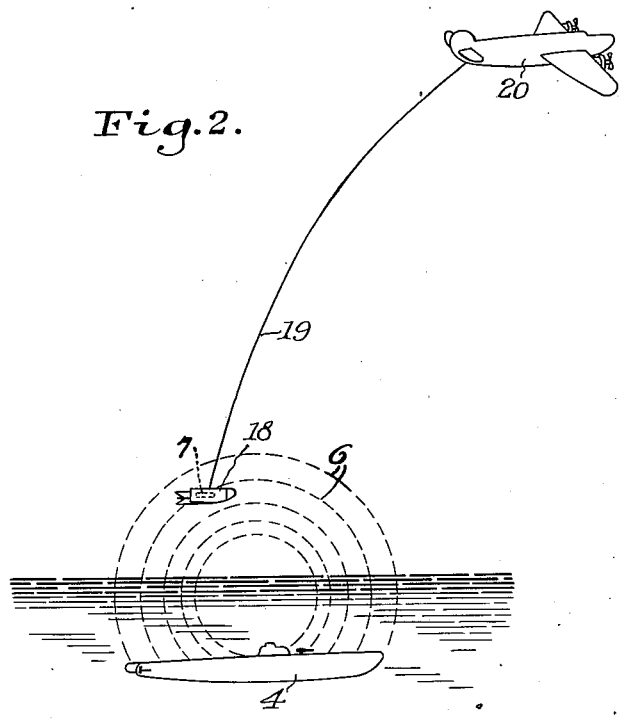
Fig. 2 is a diagrammatic representation illustrating the manner of use of an embodiment of the invention.

Referring to Fig. 2 it will be seen that the scanning plane 18 is towed from an aeroplane by the output cable 19 by means of which it may be lowered from the plane until it is gliding close to the surface of the water. As it enters the electromagnetic field 6 generated by the submarine 4, the unbalance of the circuit as described above will take place and the pilot of the plane 20 will be placed on notice of the presence of the submarine.

While I have illustrated my device for use in connection with an aeroplane, it is clear that any towing device may be used so long as the scanning plane 18 is kept at a sufficient distance from the towing device to be free from the electromagnetic pulses generated by such towing device. Accordingly, I do not wish to be limited to the particular details of assembly shown since various modifications within the spirit of the invention will suggest themselves to those skilled in the art.

Having thus described my invention, what I claim as new and wish to secure by Letters Patent is:

1. In a submarine detecting apparatus adapted to cooperate with a variable magnetic field created immediately above the surface of a body of water by the electrical equipment of a submarine submerged beneath such surface, the combination of a towing plane, a miniature scanning plane attached to the towing plane and adapted to be drawn through said magnetic field in scanning relation with respect to the surface of said body of water, a pickup unit in connection with said scanning plane, said unit including a magnetic induction device and an amplifying system provided with input and output circuits, said induction device comprising two pairs of relatively stationary coils, the coils of each pair thereof being series connected and adapted to be linked to the same magnetic circuit, the respective pairs of coils being arranged in planes normal to each other and connected in electrical opposition to the input of said amplifying system whereby no current flow occurs in the coils of said device during its passage through a uniform magnetic field, but when said device is drawn through a variable magnetic field, the current induced in its coils by the variations of the magnetic field and the spaced position therein of said coils, will produce a current flow in the input and output circuits of said amplifying system, and an indicator carried by said towing plane and in electrical relation with the output circuit of said amplifying system, said indicator being responsive to the current flow in said output circuit to indicate the presence of said submarine under conditions precluding the transmission thereto of detectable impulses.

2. In a submarine detecting apparatus adapted to cooperate with a variable magnetic field created immediately above the surface of a body of water by the electrical equipment of a submarine submerged beneath such surface, the combination of a towing plane, a miniature scanning plane attached to the towing plane and adapted to be drawn through said magnetic field in scanning relation with respect to the surface of said body of water, a pickup unit in connection with said scanning plane, said unit including a magnetic induction device, a balanced transformer and an amplifying system provided with input and output circuits, said induction device comprising two pairs of relatively stationary coils the coil of each pair thereof being series connected and adapted to be linked to the same magnetic circuit, the respective pairs of coils being arranged in planes normal to each other and connected in electrical opposition to the input of said amplifying system through said balanced transformer whereby no current flow occurs in the coils of said device during its passage through a uniform magnetic field, but when said device is drawn through a variable magnetic field the current induced in its coils by the variations of the magnetic field and the spaced position therein of said coils will produce a current flow in the input and output circuits of said amplifying system and an indicator carried by said towing plane and in electrical relation with the output circuit of said amplifying system, said indicator being responsive to current flow in said output circuit to indicate the presence of said submarine under conditions precluding the transmission thereto of detectable impulses.

3. In a submarine detecting apparatus adapted to cooperate with a variable magnetic field created immediately above the surface of a body of water by the electrical equipment of a submarine submerged beneath such surface, the combination of a towing plane, a miniature scanning plane attached to the towing plane and adapted to be drawn through said magnetic field in scanning relation with respect to the surface of said body of water, a pickup unit in connection with said scanning plane said unit including a magnetic induction device, a balanced transformer and an amplifying system provided with input and output circuits, said induction device comprising a pair of magnetic cores, one of said cores being disposed in a plane normal to that of the other of said cores, coils formed upon the extremities of said cores, the respective pairs of coils being relatively stationary and connected in electrical opposition to the input circuit of said amplifying system through said balanced transformer whereby no current flow occurs in the coils of said device during its passage through a uniform magnetic field but when said device is drawn through a variable magnetic field the current generated in its coils by the variations of the magnetic field and the spaced position therein of said coils will produce a current flow in the input and output circuit of said amplifying system, and an electrical indicator carried by said towing plane and in electrical relation with the output circuit of said amplifying system, said indicator being responsive to the current flow in the output circuit of said amplifying system to indicate the presence of said submarine under conditions precluding the transmission thereto of detectable impulses.

4. In a submarine detecting apparatus adapted to cooperate with a variable magnetic field created immediately above the surface of a body of water by the electrical equipment of a submarine submerged beneath such surface, the combination of a towing plane, a miniature scanning plane attached to the towing plane and adapted to be drawn through said magnetic field in scanning relation with respect to the surface of said body of water, a pickup unit in connection with said scanning plane including a magnetic induction device, a balanced transformer and an amplifying system provided with input and output circuits, said induction device comprising a pair of magnetic cores, one of said cores being disposed in a plane normal to that of the other of said cores, relatively stationary coils formed upon the extremities of said cores, the two coils of each core being series connected and adapted to be linked to the same magnetic circuit through the core common to said coils, the respective pairs of coils on each of said cores being connected in electrical opposition to the input of said amplifying system through said balanced transformer whereby no current flow occurs in the coils of said device during its passage through a uniform magnetic field but when said device is drawn through a variable magnetic field with variations thereof and spaced position therein of said coils will induce a current in said coils and produce the current flow in the input and output circuits of said amplifying system, and an indicator carried by said towing plane and in electrical relation with the output circuit of said amplifying system, said indicator being responsive to the current flow in said output circuit to indicate the presence of said submarine under conditions precluding the transmission thereto of detectable impulses.

5. In a submarine detecting apparatus adapted to cooperate with a variable magnetic field created immediately above the surface of a body of water by the electrical equipment of a submarine submerged beneath such surface, the combination of a towing plane, a miniature scanning plane attached to the towing plane and adapted to be drawn through said variable magnetic field in scanning relation with respect to the surface of said body of water, a pick-up unit within said scanning plane, said unit including an output circuit and a magnetic induction device connected therewith, said device comprising a series of relatively stationary coils connected to said output circuit and arranged in a manner such that no current flow occurs in the coils of said induction device during its passage through a uniform magnetic field but when said device is drawn through a variable magnetic field the current generated in its coils by the variations of the magnetic field and the relative position therein of said coils will produce a current flow in said output circuit and an electrical indicator aboard said towing plane in electrical relation with said output circuit and responsive to the current flow therein to indicate the presence of said submarine under conditions precluding the transmission thereto of detectable impulses.

HENRY A. D. LINDSEY.